US007990927B2

(12) United States Patent
Choi et al.

(10) Patent No.: US 7,990,927 B2
(45) Date of Patent: Aug. 2, 2011

(54) METHOD AND APPARATUS FOR TRANSMITTING DATA IN A COMMUNICATION SYSTEM

(75) Inventors: Hyung-Nam Choi, Hamburg (DE); Manfred Zimmermann, Sauerlach (DE); Michael Eckert, Braunschweig (DE); Michael Benkert, Burgdorf-Hohenassel (DE)

(73) Assignee: Infineon Technologies AG (DE)

( * ) Notice: Subject to any disclaimer, the term of this patent is extended or adjusted under 35 U.S.C. 154(b) by 415 days.

(21) Appl. No.: 11/555,099

(22) Filed: Oct. 31, 2006

(65) Prior Publication Data

US 2008/0101313 A1 May 1, 2008

(51) Int. Cl.
*H04B 7/216* (2006.01)
*H04L 12/28* (2006.01)
(52) U.S. Cl. .................. 370/335; 370/342; 370/441
(58) Field of Classification Search .............. 375/148; 370/210, 342, 462, 445, 441
See application file for complete search history.

(56) References Cited

U.S. PATENT DOCUMENTS

| | | | |
|---|---|---|---|
| 5,909,436 A | 6/1999 | Engstrom et al. | |
| 2001/0026539 A1 | 10/2001 | Kornprobst et al. | |
| 2002/0028690 A1* | 3/2002 | McKenna et al. | 455/517 |
| 2002/0041578 A1 | 4/2002 | Kim et al. | |
| 2002/0075839 A1* | 6/2002 | Dick et al. | 370/342 |
| 2004/0001429 A1* | 1/2004 | Ma et al. | 370/210 |
| 2004/0247019 A1* | 12/2004 | McDonough et al. | 375/148 |
| 2005/0070283 A1* | 3/2005 | Hashimoto et al. | 455/435.1 |
| 2005/0164663 A1* | 7/2005 | Santhoff et al. | 455/226.1 |
| 2005/0232342 A1 | 10/2005 | Batra et al. | |
| 2005/0271025 A1 | 12/2005 | Guethaus et al. | |
| 2007/0086381 A1* | 4/2007 | Lee et al. | 370/331 |
| 2007/0116099 A1* | 5/2007 | Banister | 375/148 |
| 2008/0123585 A1* | 5/2008 | Granzow et al. | 370/320 |
| 2008/0311927 A1* | 12/2008 | Boman et al. | 455/456.1 |

FOREIGN PATENT DOCUMENTS

WO WO-02/051048 A2 6/2002

OTHER PUBLICATIONS

3GPP TS 25.331 V6.9.0 (Mar. 2006); *Technical Specification*; 3rd Generation Partnership Project; Technical Specification Group Radio Access Network; Radio Resource Control (RRC); Protocol Specification (Release 6); pp. 1-1209.
3GPP TS 25.214 V6.8.0 (Mar. 2006); *Technical Specification*; 3rd Generation Partnership Project; Technical Specification Group Radio Access Network; Physical layer procedures (FDD)(Release 6); pp. 1-60.
3GPP TR 25.814 V7.0.0 (Jun. 2006); *Technical Report*; 3rd Generation Partnership Project; Technical Specification Group Radio Access Network; Physical layer aspects for evolved Universal Terrestrial Radio Access (UTRA)(Release 7); pp. 1-126.
Panasonic; "Randon access burst design for E-UTRA"; R1-061766, TSG-RAN WG1 LTE Ad hoc meeting, Cannes, France, Jun. 27-30, 2006; pp. 1-5.
3GPP TSG-RAN WG1 LTE Ad hoc meeting, Cannes, France, Jun. 27-30, 2006; "Random access procedure for E-UTRA; R1-061765"; [Online]; Retrieved from the Internet: URL: http://www.3gpp.org/ftp/tsg_ran/WG1_RL1/TSGR1_AH/LTE_AH_June-06/Docs/ [retrieved on Feb. 22, 2008];pp. 1-4.

* cited by examiner

*Primary Examiner* — George Eng
*Assistant Examiner* — Nizar Sivji
(74) *Attorney, Agent, or Firm* — Dickstein Shapiro LLP

(57) ABSTRACT

An apparatus and method of grouping and assigning a plurality of random access sequences, including assigning each random access sequence to one or a plurality of user equipments, to a plurality of users, type of users or types of communication connection.

27 Claims, 8 Drawing Sheets

METHOD AND APPARATUS FOR TRANSMITTING DATA IN A COMMUNICATION SYSTEM

BACKGROUND

The present invention relates to a method of transmitting data in a communication system, methods of grouping and assigning a plurality of random access sequences, an apparatus of transmitting data and a communication device.

In a mobile communication system using a so-called Slotted ALOHA access procedure, there is a high probability of collisions when a plurality of communication devices try to access radio resources.

For these and other reasons there is a need for the present invention as will be described in more detail below.

For clarity, previously identified features retain their reference indicia in subsequent drawings, where appropriate.

DETAILED DESCRIPTION OF EXEMPLARY EMBODIMENTS

The Frequency Division Duplex (FDD) of a Universal Mobile Telecommunication system (UMTS) according to Release 6 is based on the Multiple Access procedure called Wideband Code Division Multiple Access (W-CDMA). In W-CDMA a random access procedure is specified for a discontinuous transmission of user data and signaling data (e.g. a request of a user equipment to the network for the setup of a communication connection) in the uplink (i.e. e.g. in the transmission direction from the user equipment to the network) with limited transmission capacity.

Some of the important characteristics of the random access procedure are as follows:

The actual message transmission is carried out via the UMTS channel Random Access CHannel (RACH) transport channel, which multiplexes in the physical protocol layer to the UMTS physical channel Physical Random Access CHannel (PRACH). The message is then transmitted to the base station (in UMTS also referred to as NodeB) via the air interface.

Up to 16 RACH/PRACH pairs may be configured for each mobile radio cell. The configured RACH/PRACH pairs are signaled to all user equipments (UEs) present in the respective mobile radio cell via the UMTS broadcast channel Broadcast Channel (BCH). The RACH/PRACH pairs represent shared resources, i.e. the usage of these resources is available for all user equipments present in the respective mobile radio cell.

The physical RACH/PRACH transmission is carried out in accordance with the so-called Slotted ALOHA access procedure. In accordance with this procedure, the user equipment selects a transmission time instant from the predefined transmission time instants in a random manner. In this case, transmission collisions may occur due to user equipments transmitting simultaneously and which have selected the same RACH/PRACH and the same transmission time instant.

Before starting with the actual message transmission on the RACH/PRACH, the user equipment transmits a preamble having a length of 4096 chips using a predefined initial transmission power to the base station. The transmission of the preamble serves for the request for resources on the RACH/PRACH and the optimal setting of the transmission power for the actual message transmission on the RACH/PRACH. A randomly selected random access sequence is transmitted in the preamble. In other words, the preamble consists of 256 repetitions of a hadamard code signature having a length of 16 chips. In total 16 signatures or random access sequences are defined for each RACH/PRACH pair, out of which the user equipment selects one in a random manner. If the base station can correctly detect the preamble, it will transmit a positive acknowledge (ACK) on the associated Acquisition Indicator Channel (AICH) to the user equipment. If the base station cannot correctly detect the preamble, it will not transmit anything on the associated AICH to the user equipment. If the user equipment does not receive any response on the AICH, the user equipment, after having waited a random waiting time period, will again transmit a preamble with a new, randomly selected signature to the base station. In this case, the preamble will be transmitted with a slightly higher transmission power compared with the previous transmission of the preamble. If the user equipment receives an ACK, the user equipment will transmit the message on the RACH/PRACH to a fixedly set time instant. In this case, the transmission power for the PRACH is set on the basis of the transmission power of the successfully transmitted preamble.

The UMTS standard Release 6 supports a prioritization of the random access by means of the definition of access service classes (ASC). At maximum, 8 ASCs having defined priority can be configured for each RACH/PRACH pair, wherein ASC#0 represents the highest priority and ASC#7 represents the lowest priority. The available transmission time instants and preamble signatures can be specified for each ASC, i.e. the higher the priority, the higher the number of the available transmission time instants and preamble signatures can be configured in the ASC.

At present, there is a topic in the Third Generation Partnership Project (3GPP) in further developing UMTS to a mobile radio system optimized for packet data transmission by improving the system capacity and spectral efficiency. These works are carried out in the 3GPP under the general name "Long Term Evolution" (LTE). The object of this is to substantially increase the maximum net transmission rates in the future to up to 100 Mbps in downlink transmission direction (i.e. e.g. in the transmission direction from the network to the user equipment) and 50 Mbps in uplink transmission direction (i.e. e.g. in the transmission direction from the user equipment to the network). To do this, new multiple access procedures are taken into account in the context of LTE. The LTE downlink is based on Orthogonal Frequency Division Multiple Access (OFDMA) in combination with Time Division Multiple Access (TDMA). The LTE uplink is based on Single Carrier Frequency Division Multiple Access (SC-FDMA) in combination with Time Division Multiple Access (TDMA). Frequency Division Duplex (FDD) and Time Division Duplex (TDD) are used as radio transmission technologies.

Furthermore, a random access procedure is taken into account for the LTE uplink, but with other characteristics compared with the random access procedure defined for UMTS based on W-CDMA:

- A preamble having a defined length (e.g. 0.4 ms) is transmitted on the physical LTE-RACH channel. A random access sequence is transmitted in the preamble.
- The preamble transmission serves for the synchronization of the timing for the uplink transmission. In other words, the base station determines the respective so-called Timing Advance value for a user equipment on the basis of the signal propagation delay of the preamble and signals it to the user equipment in the downlink. The Timing Advance is to be understood as the time by which the user equipment should transmit its data earlier so that the data can be received in the base station in a synchronous manner.
- Furthermore, the preamble transmission serves for an implicit signaling of information e.g. with respect to the access type (e.g. request for setup of a communication connection) or with respect to the quality of the current channel quality. The amount of the implicit signaling information directly depends on the number of the available random access sequences.

With regard to the grouping of the random access sequences, various proposals exist, in which the random access sequences are grouped in accordance with the type of the random access and the additional information to be simultaneously signaled. The proposals can be carried out in principle, however, they have disadvantages e.g. with respect to the extendability due to the limited number of the available signatures. Furthermore, it is not possible without any problems to signal a simple indication of the random access, e.g. the priority of the random access or a defined user priority, to the base station using the transmitted signature.

One embodiment of the invention provides an advantageous implementation of a random access procedure, which may be used in the LTE system, and which does not show at least some of the disadvantages mentioned above.

The RACH/PRACH transmission procedure in the UMTS FDD mode in accordance with UMTS Release 6 (based on W-CDMA) will be described in more detail below.

Up to 16 RACH/PRACH pairs can be configured in one mobile radio cell at maximum. The configuration of these cell specific RACH/PRACH pairs is transmitted from the base station to all user equipments present in the mobile radio cell via broadcast on the UMTS transport channel BCH. In more detail, the configuration of the individual RACH/PRACH pairs is transmitted on the BCH in the System Information Blocks (SIB) SIB5 (which is usually relevant for user equipments in the radio resource control (RRC) state "Idle mode") and SIB6 (which is usually relevant for user equipments in the Connected Mode, i.e. for the user equipments in the radio resource control (RRC) states "CELL_PCH", "URA_PCH" or "CELL_FACH") by means of the Information Element (IE) "PRACH system information list".

The configuration for each RACH/PRACH pair may comprise the following parameters:

PRACH info:
  In this case, the configuration of the PRACHs with respect to the available signatures, Access Slots, spreading factors, and the preamble scrambling codes is signaled;
Transport channel identity:
  Indicates the identity of the RACH transport channel, which is multiplexed on the PRACH;
RACH TFS:
  Indicates the set of the allowed transport formats and the transmission time interval TTI for the configured RACH;
RACH TFCS:
  Indicates the set of the allowed transport format combinations for the configured RACH;
PRACH partitioning:
  Signals up to eight Access Service Classes (ASCs) based on the signatures and Access Slots configured by the parameter "PRACH info". A subset of the totally available signatures and Access Slots can be configured in each ASC, so that an ASC represents a dividing or partitioning of the PRACH resources.
Persistence scaling factors:
  Indicates the transmission probability with which the Medium Access Control (MAC) protocol layer controls the RACH transmission procedure.
AC-to-ASC mapping table:
  This parameter is used to signal the mapping of the Access Classes (AC) to the Access Service Classes (ASC), which enables a user equipment in the RRC state "Idle mode" to transmit an initial message in the uplink. The Access Classes (AC) are used to control the access of a mobile radio user into a mobile radio cell of the UMTS mobile radio network.
Primary CPICH DL TX power:
  The power which is used for transmitting the Primary Common Pilot Channel (PCPICH) in the mobile radio cell in the downlink. The parameter is used for the calculation of the initial output power of the PRACH preamble.
Constant value:
  Constant value, which is used for the calculation of the initial output power of the PRACH preamble.
PRACH power offset:
  Indicates the parameters for the PRACH preamble transmission such as e.g. the step size for the transmission power setting and the maximum number of the preamble re-transmissions.
RACH transmission parameters
  Indicates the parameters for the control of the RACH transmission in the MAC protocol layer level.

AICH info:
Indicates the parameters for the AICH associated with the respective PRACH.

In principle, all user equipments within a UMTS cell can share the RACH/PRACHs for data transmission. The access of the user equipments to a RACH/PRACH is controlled in accordance with the Slotted ALOHA procedure, according to which each user equipment randomly selects a suitable RACH/PRACH and transmits it only at the beginning of defined transmission time intervals, the so-called Access Slots (AS). In this case, the use of the randomly selected RACH/PRACHs depends on the ASCs, which are specified by the parameter "PRACH partitioning". A prioritized RACH/PRACH usage is controlled by the ASCs.

Figure 1:
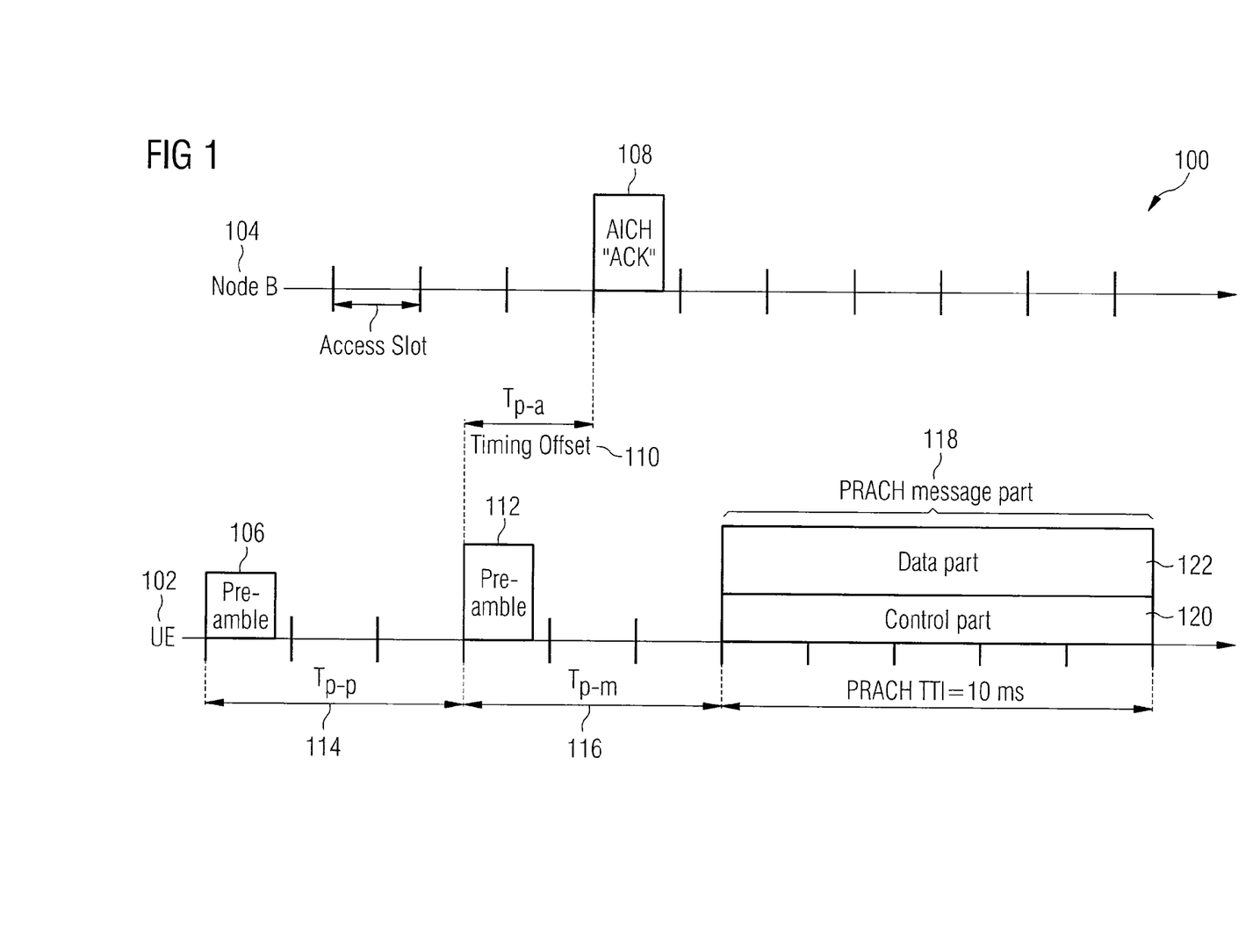
FIG. 1 illustrates a physical RACH/PRACH transmission procedure.

The physical RACH/PRACH transmission procedure is illustrated in a diagram 100 in FIG. 1 and will be described in more detail below:

Before the start of the actual data transmission on the PRACH, a user equipment 102 generates and transmits a preamble 106 having a length of 4096 chips to a base station 104 (in UMTS also referred to as NodeB). A randomly selected signature is transmitted in the preamble 106. If the base station 104 is able to correctly detect the preamble 106, it generates and transmits a positive confirmation (also referred to as acknowledgement) (ACK) 108 on the Acquisition Indicator CHannel (AICH) to the user equipment 102 within a time interval (Timing Offset $\tau_{p-a}$) 110. If the base station 104 is not able to correctly detect the preamble 106, it does not transmit anything on the AICH.

If the user equipment 102 does not receive any response on the AICH, the user equipment 102 will again transmit a preamble 112 having a new, randomly selected signature to the base station 104 after a random waiting time interval (Timing Offset $\tau_{p-p}$) 114. In this case, this preamble 112 will be transmitted using a slightly higher transmission power than for the previous preamble 106 transmission.

If the user equipment 102 receives the positive confirmation ACK 108, the user equipment 102 will transmit the data (e.g. using a PRACH message part 118) on the PRACH (for example of the time transmission interval TTI=10 ms) at a fixed time instant (Timing Offset $\tau_{p-m}$) 116. In this case, the transmission power for the PRACH is set on the basis of the transmission power of the successfully transmitted preamble 112. The PRACH message part 118 includes or consists of a control part 120 and a data part 122, to which the data of the RACH transport channel are multiplexed.

As already mentioned, the UMTS standard Release 6 supports a prioritization of the random access by means of the definition of Access Service Classes (ASCs). At maximum, 8 ASCs having a defined priority can be configured for each RACH/PRACH pair, wherein ASC#0 represents the highest priority and ASC#7 represents the lowest priority. The available PRACH transmission time instants and the available preamble signatures can be specified for each ASC, i.e. the higher the priority, the higher the number of the available PRACH transmission time instants and preamble signatures can be configured in the ASC. In the Idle mode, the RRC protocol layer in the user equipment selects the ASC on the basis of the Access Classes (AC). In the Connected Mode, the MAC protocol layer in the user equipment decides on the ASC on the basis of the priority of the logical channels via which the data on the RACH transport channel and the PRACH physical channel are transmitted to the UMTS mobile radio network via the air interface. By way of example, a high priority random access can be realized in case of an emergence call in such a way that in this case, this random access is mapped to the ASC#0, in which the number of the available signatures and access transmission time instants is the maximum. Thus, the probability of collisions is minimal.

One disadvantage of the conventional approach can be seen in that the base station cannot determine the priority of the random access from the reception of the preamble or the signature. This becomes only possible after the reception of the actual message on the RACH/PRACH and only on a higher protocol layer level.

Some basics on various multiple access procedures will now be described:

For the future UMTS communication system, a combined OFDMA/TDMA procedure will be used as multiple access procedure for the downlink and a combined SC-FDMA/TDMA procedure will be used as multiple access procedure for the uplink.

OFDMA/TDMA is a multi-carrier multiple access procedure, in which a user is provided with a defined number of sub-carriers in the frequency spectrum and a defined transmission time interval in the time spectrum for data transmission.

Figure 2A:
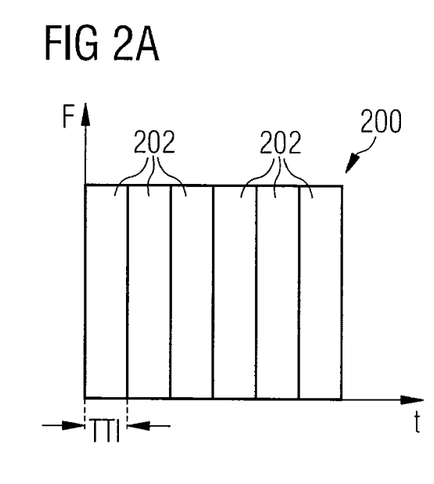
FIG. 2A illustrates a diagram showing the basic principle of Time Division Multiple Access.
Figure 2B:
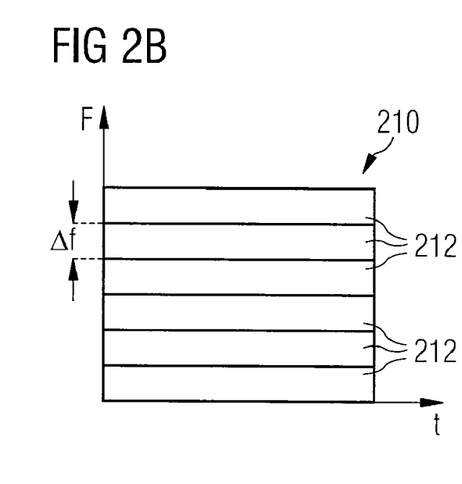
FIG. 2B illustrates a diagram showing the basic principle of Frequency Division Multiple Access.
Figure 2C:
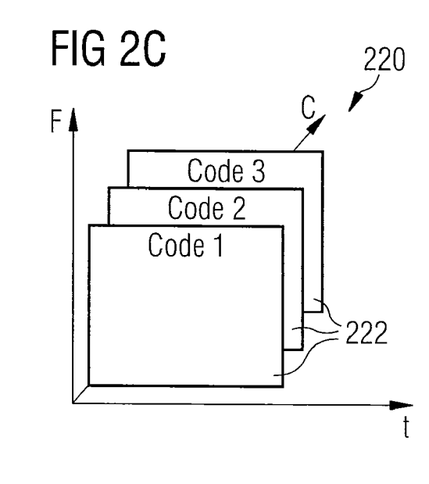
FIG. 2C illustrates a diagram showing the basic principle of Code Division Multiple Access.

For a better understanding, FIG. 2A, FIG. 2B and FIG. 2C illustrate the following basic multiple access procedures:
Time Division Multiple Access (TDMA);
Frequency Division Multiple Access (FDMA); and
Code Division Multiple Access (CDMA).

In the FIGS. 2A to 2C, F denotes the frequency axis and t denotes the time axis:

As shown in a first diagram 200 in FIG. 2A, in Time Division Multiple Access (TDMA), each user is provided with the entire frequency band but only with a defined Transmission Time Interval (TTI) 202 for transmitting. During each TTI 202, only one transmitter is active.

As shown in a second diagram 210 in FIG. 2B, in (Single Carrier) Frequency Division Multiple Access ((SC)-FDMA), each user is provided with the entire time but only with a defined frequency bandwidth for transmitting. In each of those frequency bands 212, only one transmitter is allowed to be active.

As shown in a third diagram 220 in FIG. 2C, in Code Division Multiple Access (CDMA), each user is provided with the entire time and the entire frequency band for transmitting. In order to prevent a mutual interference of the signals from different transmitters, each user is assigned with a binary code pattern 222, which are independent from each other and with the aid of which the use signal is user specifically coded or spreaded.

Orthogonal Frequency Division Multiple Access (OFDMA) is a particular embodiment of the FDMA and represents a multi-carrier procedure in which the signal bandwidth B is subdivided into M orthogonal subbands, in other words, in M subbands, which are orthogonal to each other. Thus, there is not only one single frequency carrier having a large bandwidth but M frequency carriers having a bandwidth $\Delta f=B/M$. In OFDMA, the data stream to be transmitted is divided on a multiplicity of sub-carriers and is transmitted in parallel using a correspondingly reduced data rate. In OFDMA, a user can be provided with the entire time and a defined number of sub-carriers for transmitting.

Figure 3:
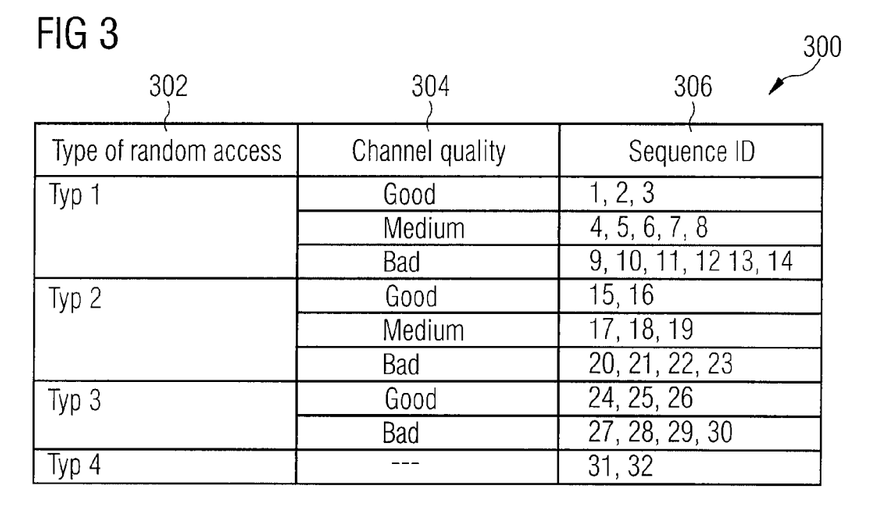
FIG. 3 illustrates a grouping table showing a grouping example of the random access sequences.

One proposal for grouping the random access sequences for the LTE RACH will now be described with reference to a grouping table 300 shown in FIG. 3.

The grouping table 300 includes three columns 302, 304, 306, wherein a first column 302 indicates the type of the random access, a second column 304 indicates the respective channel quality, and a third column 306 indicates the respective random access sequence identifier.

Without limitation, a case with 32 available random access sequences is assumed. Four different types of random accesses are considered and, as shown in FIG. 3, depending on the type of the random access and depending on the channel quality to be signaled, a different number of random access sequences is assigned, the random access sequences being identified by means of unique random access sequence identifiers (in the following also referred to as Sequence IDs). By way of example, in the case of a preamble transmission using the Sequence ID=8 it is signaled to the base station that it is referring to random access type "1" 302 (e.g. a request for setup of a communication connection). The current channel quality 304 in the mobile radio cell (e.g. the channel quality="Medium") is signaled to the base station. The base station can take this information into account with respect to the allocation of the mobile radio resources for the setup of the communication connection.

However, this procedure, although being implementable in principle, has the following disadvantages:

- The procedure is only extendable in a limited manner due to the limited number of the available random access sequences, i.e. the higher the number of the defined random access types, the smaller the number of available random access sequences will be for each single random access type. Thus, the collision probability will increase for each random access type.
- High priority random accesses such as for example emergency calls could be implemented in such a way that a specific random access type having a defined number of random access sequences is configured for such a high priority random access. However, this has the disadvantage that those random access sequences then cannot be provided for "normal" usage and can thus possibly be used only very rarely. Furthermore, due to the limited number of the random access sequences only a limited number of random access sequences can be reserved for such a high random access such as emergency calls, so that the collision probability increases in emergency cases and thus the transmission of an emergency call may become impossible under certain circumstances.
- It is not straightforward possible to signal a simple indication of the random access to the base station using the transmitted random access sequence, e.g. the priority of the random access or a defined user priority.

Figure 4:
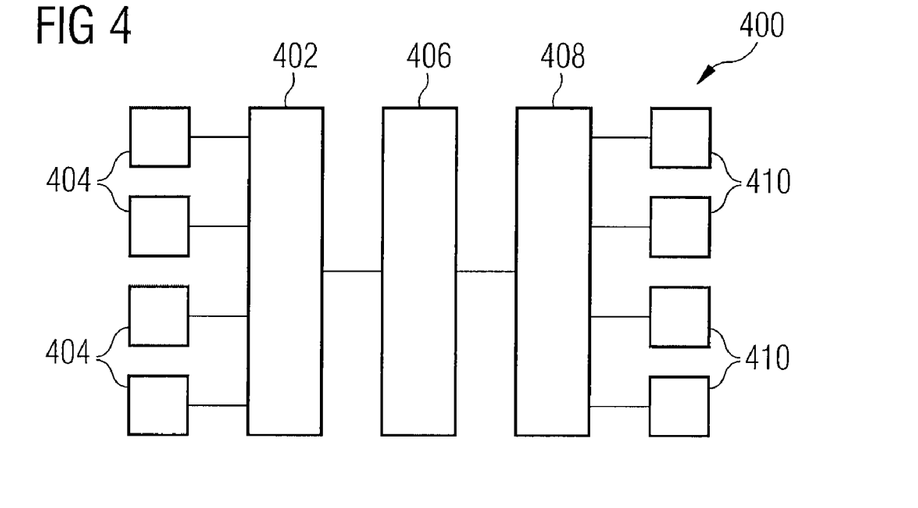
FIG. 4 illustrates a communication system in accordance with one embodiment of the invention.

FIG. 4 illustrates a communication system 400 in accordance with one embodiment of the invention. In one embodiment of the invention, the communication system 400 and its components are configured in accordance with a mobile radio communication system, e.g. in accordance with a UMTS standard, e.g. in accordance with a "Long Term Evolution" UMTS standard. However, in alternative embodiments of the invention, any other communication system may be used, e.g. any communication system which uses random access sequences e.g. for a setup of a communication connection, e.g. for uplink data transmission, i.e. for a data transmission from a user equipment to the communication network.

In one embodiment of the invention, the communication system 400 includes a plurality of mobile radio cells and one or a plurality of base stations (in the following also referred to as NodeB) 402, whereby each base station supports one or a plurality of mobile radio cells. Furthermore, as shown in FIG. 4, the communication system 400 includes a plurality of user equipments (UEs) 404, which are connected to at least one base station 402. Furthermore, the communication system 400 includes a core network 406 which provides a connection to other base stations 408 of other mobile radio cells, for example, and via those, with one or more other user equipments 410.

In the context of this description, a user equipment may be understood as being any kind of electronic device that is capable of communicating in the above and in the following described manner. By way of example, a user equipment may be understood as being any kind of communication device such as e.g. a wireless phone, a mobile radio terminal, a personal digital assistant, a laptop, a notebook, a personal computer, a wireless local area network device, etc. In one embodiment of the invention, the user equipments are UMTS user equipments.

Figure 5:
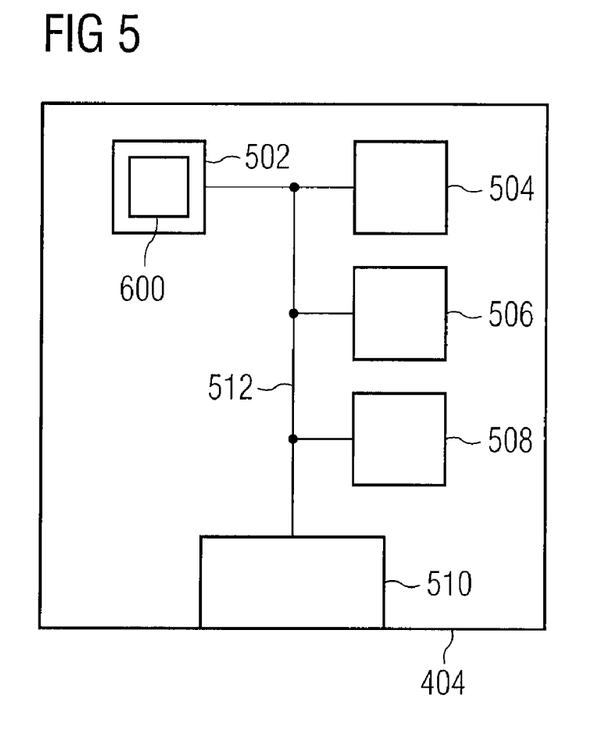
FIG. 5 illustrates a user equipment in accordance with one embodiment of the invention.

FIG. 5 illustrates a user equipment 404 in accordance with one embodiment of the invention in more detail.

The user equipment 404 includes a tree structure memory 502. A hierarchical tree structure is stored in the tree structure memory 502.

Figure 6:
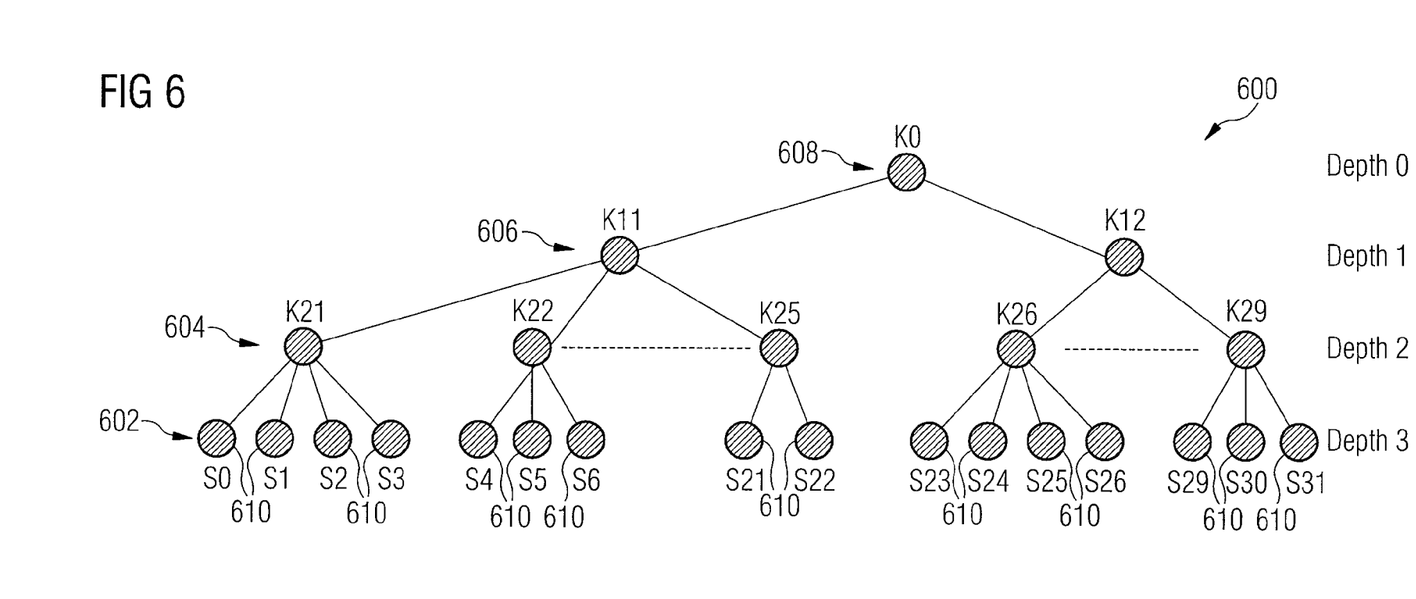
FIG. 6 illustrates a hierarchical tree structure in accordance with one embodiment of the invention.

In one embodiment of the invention, as shown in a hierarchical tree structure 600 in FIG. 6, pre-defined random access sequences, e.g. defined for a random access channel, e.g. defined for the UMTS Random Access Channel (RACH), e.g. defined for the Long Term Evolution UMTS Random Access Channel (LTE-RACH) are grouped in the form of a hierarchical tree standing on its head.

In one embodiment of the invention, the hierarchical tree structure 600 has at least two hierarchy levels, e.g. at least three hierarchy levels, and at least one bottom level. In one embodiment of the invention, the hierarchical tree structure 600 has as many hierarchy levels as desired in the specific application. Furthermore, more than one bottom levels may be provided in an alternative embodiment of the invention. In one embodiment of the invention, the hierarchical tree structure 600 has exactly one bottom level 602, a first hierarchy level 604 disposed above the bottom level 602, a second hierarchy level 606 disposed above the first hierarchy level 604 and a third hierarchy level 608 disposed above the second hierarchy level 606.

The bottom level 602 includes a plurality of leaf nodes 610. In one embodiment of the invention, the bottom level 602 includes 32 leaf nodes 610, although in an alternative embodiment of the invention, any other number of leaf nodes 610 may be provided in the bottom level 602 of the hierarchical tree structure 600. At least one, in one embodiment of the invention exact one random access sequence $S0, S1, S2, S3, \ldots, S31$ (in other words, $S_i$, $i=0, \ldots, R$, R being e.g. 31) is assigned to each leaf node 610. In one embodiment of the invention, 32 random access sequences $S0, S1, S2, S3, \ldots, S31$ are provided in the bottom level 602 of the hierarchical tree structure 600.

Further, the hierarchical tree structure 600 in accordance with one embodiment of the invention has nine first hierarchy nodes $K21, K22, \ldots, K25, K26, \ldots, K29$ (in other words, $K2j$, $j=1, \ldots, M$, M being e.g. 9) in the first hierarchy level 604. In one embodiment of the invention, each one of the first hierarchy nodes $K21, K22, \ldots, K25, K26, \ldots, K29$ is connected to at least one, e.g. exactly one leaf node 610 via a respective first edge of the hierarchical tree structure 600. As will be described in more detail below, a predetermined specific information is assigned to each one of the first hierarchy nodes $K21, K22, \ldots, K25, K26, \ldots, K29$, in other words, a predetermined specific information is stored in each one of the first hierarchy nodes $K21, K22, \ldots, K25, K26, \ldots, K29$. In other embodiments of the invention, an arbitrary number of first hierarchy nodes K21, K22, . . . , K25, K26, . . . , K29 may be provided in the first hierarchy level 604.

Further, the hierarchical tree structure 600 in accordance with one embodiment of the invention has two second hierarchy nodes K11, K12 (in other words, K1$f$, $f$=1, . . . , P, P being e.g. 2) in the second hierarchy level 606. In one embodiment of the invention, each one of the second hierarchy nodes K11, K12 is connected to at least one, e.g. exactly one of the first hierarchy nodes K21, K22, . . . , K25, K26, . . . , K29 via a respective second edge of the hierarchical tree structure 600. As will be described in more detail below, another predetermined specific information is assigned to each one of the second hierarchy nodes K11, K12, in other words, a predetermined specific information is stored in each one of the second hierarchy nodes K11, K12. In other embodiments of the invention, an arbitrary number of second hierarchy nodes K11, K12 may be provided in the second hierarchy level 606.

Further, the hierarchical tree structure 600 in accordance with one embodiment of the invention has one third hierarchy node K0 in the third hierarchy level 608, wherein the third hierarchy node K0 serves as a root hierarchy node. In one embodiment of the invention, the third hierarchy node K0 is connected to at least one, e.g. exactly one of the second hierarchy nodes K11, K12 via a respective third edge of the hierarchical tree structure 600. As will be described in more detail below, another predetermined specific information is assigned to the third hierarchy node K0, in other words, a predetermined specific information is stored in the third hierarchy node K0. In other embodiments of the invention, an arbitrary number of third hierarchy nodes K0 may be provided in the third hierarchy level 608.

In one embodiment of the invention, a non-binary hierarchical tree is provided having a tree depth N, in other words, N denotes the maximum distance between the uppermost node (e.g. the root node, e.g. the third hierarchy node K0) of the hierarchy levels (e.g. of the third hierarchy level 608) and the lowermost node (e.g. the lowermost leaf node 610 of the bottom level 602). A non-binary hierarchical tree may be understood as a tree, wherein at least one further node and T further nodes at maximum (T being greater than 1) originate from each node. In an alternative embodiment of the invention, the hierarchical tree structure 600 may be provided as a binary hierarchical tree, wherein at least one further node and two further nodes at maximum originate from each node. Each tree depth of the plurality of tree depths consists of a number of nodes. Referring back to FIG. 6, the nodes are represented as circles, from which branches may originate. The connections between two nodes are the edges of the hierarchical tree. The uppermost node generally is referred to as the root or the source of the hierarchical tree. The lowermost nodes (e.g. those nodes from which no further branches originate) are generally referred to as the leafs of the hierarchical tree. Thus, the hierarchical tree structure 600, for example, has a tree depth of 3 and consists of 32 leaf nodes 610.

In one embodiment of the invention, the hierarchical tree structure 600 has the following characteristics:

A predetermined information is stored in each node of the plurality of nodes, wherein the random access sequences are assigned to the leaf nodes (in other words, the each one of the leaf nodes represents one random access sequence). The predetermined information may be information about an assigned user, a user equipment or a communication connection, etc. Furthermore, any other desired information may be provided as the predetermined information.

Each node which is not a leaf node includes a partial tree having a defined number of available leaf nodes and thus a defined number of available random access sequences.

Each depth of the tree (also referred to as tree depth) represents a defined priority of the random access, wherein the tree depth 0 has the highest priority and wherein the tree depth N has the lowest priority. Thus, all nodes of the same tree depth (in other words all nodes in the same hierarchy level) have the same priority.

Although the hierarchical tree structure 600 shown in FIG. 6 has edges between nodes of directly adjacent hierarchy levels, in an alternative embodiment of the invention, the hierarchical tree structure may have connections connecting the nodes of hierarchy levels which are arranged further away from each other. By way of example, one second hierarchy node K11, K12 may be directly connected with one or a plurality leaf nodes 610, if desired, by means of for example only one edge.

In one embodiment of the invention, a solution for the realization of the random access procedure is provided for an LTE communication system, for example.

Referring now back to FIG. 5, the user equipment 404 further includes a first selector 504 selecting a hierarchy node out of the plurality of hierarchy nodes of the hierarchical tree structure 600. Furthermore, a second selector 506 is provided selecting at least one random access sequence from a subset of random access sequences, the subset including the random access sequences which are associated with bottom nodes that are included in a partial tree structure of the hierarchical tree structure 600 having the selected hierarchy node as a partial tree root node.

Moreover, the user equipment 404 includes a message generator 508 generating one or a plurality of messages using the at least one selected random access sequence. In one embodiment of the invention, the message generator 508 generates one or a plurality of preamble messages including the at least one selected random access sequence, as will be described in more detail below. In one embodiment of the invention, the message generator 508 generates one or a plurality of RACH preamble messages including the at least one selected random access sequence.

In one embodiment of the invention, the first selector 504, the second selector 506 and the message generator 508 may be provided as separate hardware units. However, in an alternative embodiment of the invention, the first selector 504, the second selector 506 and the message generator 508 may be implemented by means of one common unit, e.g. by means of one common programmable processor, e.g. by means of a programmable microprocessor. In this embodiment of the invention, the first selector 504, the second selector 506 and the message generator 508 may be provided as respective computer programs implementing the desired functions and processes.

Moreover, the user equipment 404 includes a transmitter/receiver 510 transmitting the generated message using the at least one selected random access sequence, as will be described in more detail below, and receiving messages, e.g. the ACK described above, from a base station 402. Further, the transmitter/receiver 510 transmits/receives user data, as also will be described in more detail below.

In one embodiment of the invention, the tree structure memory 502, the first selector 504, the second selector 506, the message generator 508 and the transmitter/receiver 510 are connected with each other e.g. by means of a user equipment internal communication connection 512, e.g. by means of a user equipment internal bus.

Figure 7:
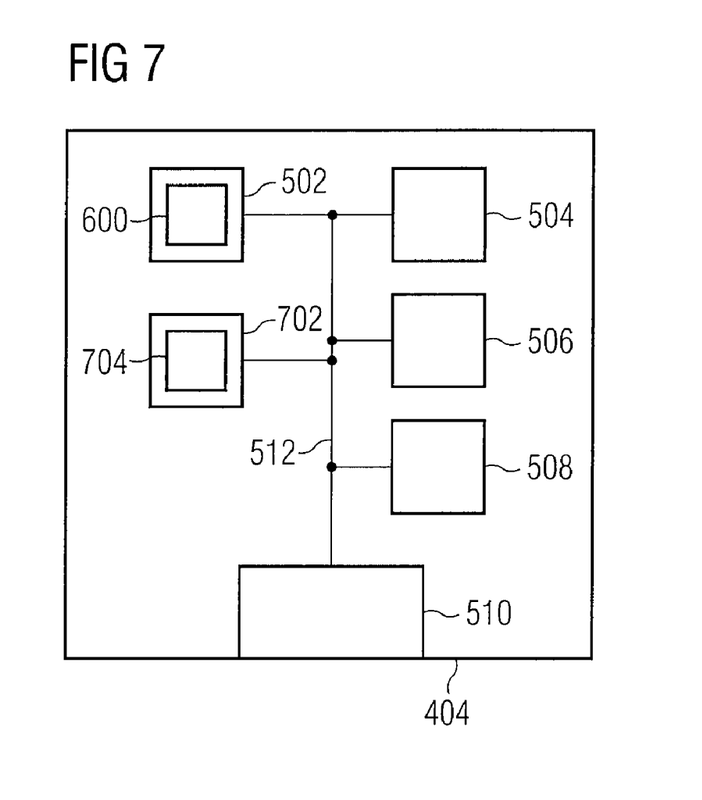
FIG. 7 illustrates a user equipment in accordance with another embodiment of the invention.

FIG. 7 illustrates a user equipment 404 in accordance with another embodiment of the invention in more detail.

The user equipment 404 in accordance with the embodiment shown in FIG. 7 includes all components of the user equipment 404 in accordance with the embodiment shown in FIG. 5. Therefore, those components will not be described again.

Furthermore, the user equipment 404 in accordance with the embodiment shown in FIG. 7 includes a scrambling code memory 702 storing a plurality of scrambling codes 704.

In accordance with one embodiment of the invention, communication system wide scrambling codes 704 may be defined, which are used to scramble the selected random access sequence to be transmitted. In an alternative embodiment of the invention, the scrambling codes 704 may be defined in a mobile radio cell specific manner. The number of scrambling codes 704 may be selected depending on the number of defined priority levels (which may correspond to the number of hierarchy levels 604, 606, 608 in the hierarchical tree structure 600). In one embodiment of the invention, one scrambling code at maximum is configured per tree depth, in other words, per hierarchy level 604, 606, 608. The total number m of the scrambling codes 704 is smaller than the depth of the hierarchical tree structure 600. In accordance with one embodiment of the invention, the number of available random access sequences is increased with each scrambling code that is defined for a tree depth. In more detail, the number of available random access sequences is increased by the set of random access sequences which are included in the partial trees of the respective tree depth 604, 606, 608. A receiver in the base station 402 can derive the priority of the random access that is associated with the respective scrambling code using the detection of the scrambling code in the received random access sequence. The scrambling codes to be used and their meaning will be communicated to the user equipment 404 by means of the network, e.g. by means of the respective base station 402, e.g. in the system information, e.g. in the system information blocks.

In order to increase the detection probability of random access sequences having higher priority it may be advantageous to stepwise arrange the allowed initial transmission power for the random access sequences in accordance with their priority. In one embodiment of the invention, the random access sequences of the tree depth 0 may start the random access procedure with a higher transmission power than the random access sequences of the tree depth 1 and so on.

As will be described in more detail below, in an alternative embodiment of the invention, the number of the scrambling codes 704 to be used is defined independently from the hierarchical tree structure 600 of the random access sequences described above. Thus, it is possible to define an arbitrary number (1, . . . , R) of scrambling codes 704 and its corresponding meaning. The assignment of scrambling codes 704 to its meaning is communicated to a user equipment by means of the network, e.g. in the system information, e.g. in the system information blocks.

Some advantages of embodiments of the invention are as follows:
- The set of available random access sequences can be extended so that the probability of collisions may thus be reduced.
- A prioritized random access is enabled.
- The base station can directly derive the priority of the random access from the reception of the preamble and random access sequences.

In one embodiment of the invention, random access sequences, which are e.g. defined for a random access channel, e.g. for the UMTS RACH, e.g. for the LTE-UMTS RACH, are grouped in a hierarchical tree structure, e.g. in a non-binary hierarchical tree structure having a tree depth N. A specific information is stored in each node of the hierarchical tree structure, wherein the leaf nodes represent the random access sequences. Each tree depth of the hierarchical tree structure represents a defined priority of the random access, wherein the tree depth 0 represents the highest priority and wherein the tree depth N represents the lowest priority.

In one embodiment of the invention, a number of scrambling codes are defined for signaling the priority of the random access, the scrambling codes being used to scramble the random access sequence to be transmitted, e.g. in the preamble message. The number of scrambling codes may be selected e.g. depending on the number of defined priority levels or depending on the number of defined meanings.

Figure 8:
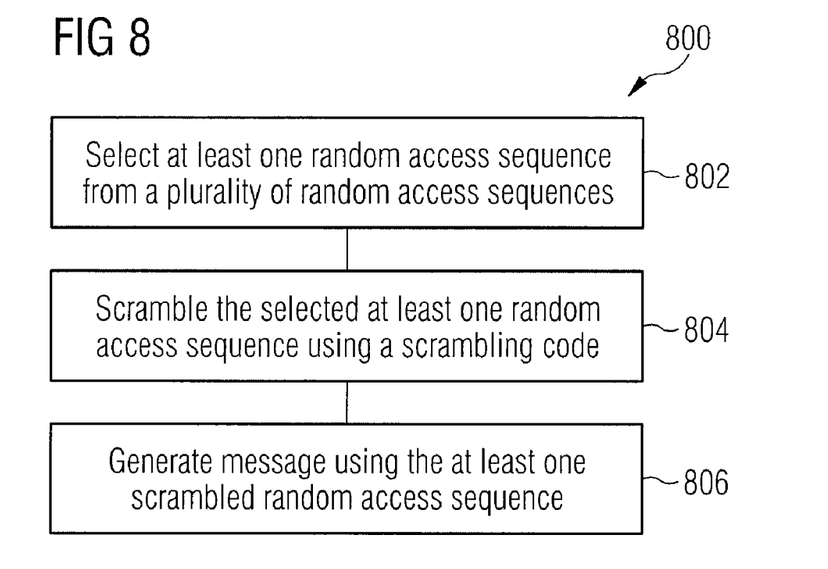
FIG. 8 shows a flow diagram illustrating a method of generating a message in a communication system in accordance with one embodiment of the invention.

FIG. 8 shows a flow diagram 800 illustrating a method of generating a message in a communication system in accordance with one exemplary embodiment of the invention.

At 802, at least one random access sequence is selected from a plurality of random access sequences, which may e.g. be stored in the tree structure memory 502.

At 804, the selected at least one random access sequence is scrambled using a scrambling code.

Furthermore, at 806, the message is generated using the at least one scrambled selected random access sequence.

Figure 9:
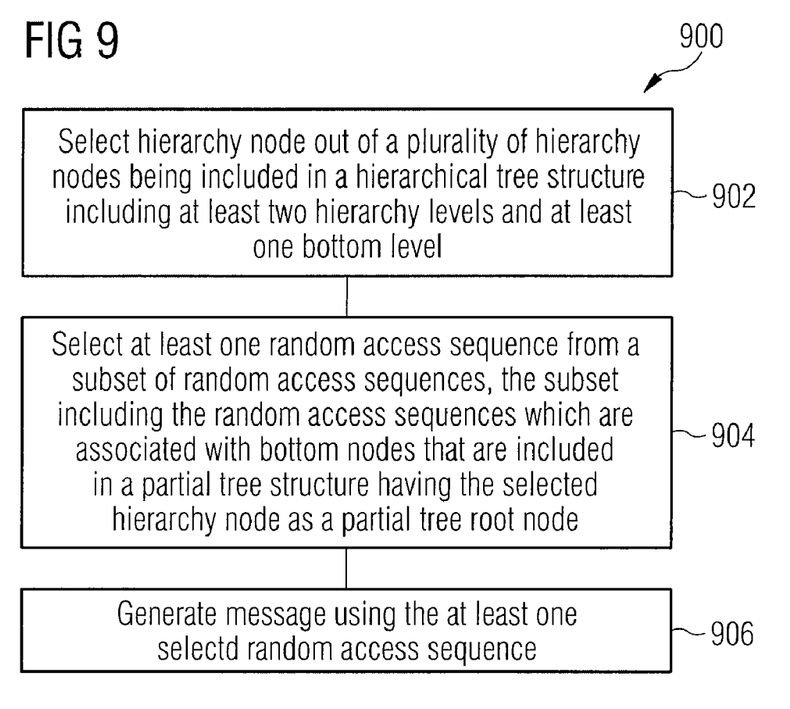
FIG. 9 shows a flow diagram illustrating a method of generating a message in a communication system in accordance with another embodiment of the invention.

FIG. 9 shows a flow diagram 900 illustrating a method of generating a message in a communication system in accordance with another exemplary embodiment of the invention.

At 902, a hierarchy node is selected out of a plurality of hierarchy nodes, the hierarchy nodes being included in a hierarchical tree structure including at least two hierarchy levels and at least one bottom level. The hierarchy nodes are assigned to the at least two hierarchy levels, and each hierarchy node has assigned information about an assigned user, a user equipment or a communication connection. The at least one bottom level includes a plurality of bottom nodes, each bottom node being associated with at least one random access sequence of a plurality of random access sequences.

At 904, at least one random access sequence is selected from a subset of random access sequences, the subset including the random access sequences which are associated with bottom nodes that are included in a partial tree structure having the selected hierarchy node as a partial tree root node.

At 906, the message is generated using the at least one selected random access sequence.

In one embodiment of the invention, the message can be a preamble message, e.g. a RACH preamble message, and the general message flow for setting up a communication connection may be carried out in a similar manner as described with reference to FIG. 1 with the difference of either using the hierarchical tree structure for storing and selecting the random access sequences used for the preamble messages and/or using the scrambling of a selected random access sequence using one or a plurality of scrambling codes and using the scrambled random access sequence for the preamble messages.

Figure 10:
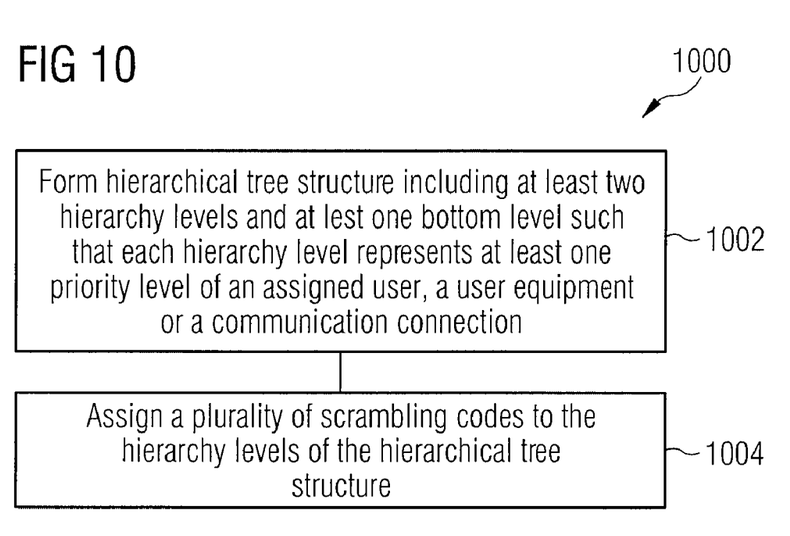
FIG. 10 shows a flow diagram illustrating a method of grouping and assigning a plurality of random access sequences in a mobile radio communication system.

FIG. 10 shows a flow diagram 1000 illustrating a method of grouping and assigning a plurality of random access sequences in a mobile radio communication system.

At 1002, a hierarchical tree structure including at least two hierarchy levels and at least one bottom level is formed such that each hierarchy level represents at least one priority level of an assigned user, a user equipment or a communication connection and each hierarchy level includes at least one hierarchy node, each hierarchy node having assigned information about an assigned user, a user equipment or a communication connection, and the at least one bottom level includes a plurality of bottom nodes, each bottom node being associated with at least one random access sequence of a plurality of random access sequences.

At 1004, a plurality of scrambling codes is assigned to the hierarchy levels of the hierarchical tree structure, wherein, in accordance with one embodiment of the invention, one scrambling code is assigned to each hierarchy level of the plurality of hierarchy levels of the hierarchical tree structure.

Without limiting the general validity and applicability of the embodiments of the invention, in the following specific embodiments of the invention, an LTE-UMTS communication system is assumed. Further it is assumed that a user equipment wants to get access to an LTE-RACH, wherein in one mobile radio cell, 32 random access sequences S0, S1, S2, S3, ..., S31 are configured in total. One or a plurality of the random access sequences S0, S1, S2, S3, ..., S31 are to be transmitted from the user equipment 404 to the base station 402 e.g. in a preamble message (e.g. 106, 112). Predefined transmitting time instants (e.g. also referred to as Access Slots) are configured on the basis of the SC-FDMA/TDMA multiple access procedure, e.g. for an uplink connection, i.e. for a data transmission from the user equipment 404 to the base station 402. The specific configuration of these cell-specific random access sequences S0, S1, S2, S3, ..., S31 and the transmitting time instants is transmitted from the base station 402 to all user equipments that are present in the respective mobile radio cell by means of broadcast transmission, e.g. using a broadcast channel, e.g. the UMTS BCH.

In one embodiment of the invention, reference is made to the hierarchical tree structure 600 in FIG. 6 having the tree depth 3 for the grouping of the 32 random access sequences S0, S1, S2, S3, ..., S31.

Those nodes that are not leaf nodes 610, i.e. for example the hierarchy nodes, include the following information:

| | | |
|---|---|---|
| - Tree | depth | 0: |
| -- | node K0 = "emergency calls" | |
| - Tree | depth | 1: |
| -- | node K11 = "High priority user" | |
| -- | node K12 = "Low priority user" | |
| - Tree | depth | 2: |
| -- | node K21 = "Access type = 1, Channel quality = Good" | |
| -- | node K22 = "Access type = 1, Channel quality = Medium" | |
| -- | ... | |
| -- | node K25 = "Access type = 3, Channel quality = Bad" | |
| -- | node K26 = "Access type = 1, Channel quality = Good" | |
| -- | ... | |
| -- | node K29 = "Access type = 2, Channel quality = Bad". | |

In one embodiment of the invention, the random access opportunities for a user are as follows:

- If a user intends to transmit an emergency call, the complete hierarchical tree structure is available for him, i.e. the user can select randomly any random access sequence from the entire set of random access sequences and can transmit this one to any arbitrary transmission time instant.
- In the above described embodiment, in total, the random access sequences S0, S1, S2, ..., S22 are available for a "High priority user" (which is based on the user's subscription with the mobile radio network provider), e.g. a "business customer", due to the following connections in the hierarchical tree structure 600:
  - The leaf nodes 610, the random access sequences S0, S1, S2, S3 are assigned to, are connected with the first hierarchy node K21 (which represents "Access type=1, Channel quality=Good"), which in turn is connected to the second hierarchy node K11 (which represents a "High priority user").
  - The leaf nodes 610, the random access sequences S4, S5, S6 are assigned to, are connected with the first hierarchy node K22 (which represents "Access type=1, Channel quality=Medium"), which in turn is connected to the second hierarchy node K11 (which represents a "High priority user").
  - ...
  - The leaf nodes 610, the random access sequences S21, S22 are assigned to, are connected with the first hierarchy node K25 (which represents "Access type=3, Channel quality=Bad"), which in turn is connected to the second hierarchy node K11 (which represents a "High priority user").
  - All other leaf nodes, the random access sequences S23, S24, ..., S31 are not assigned to, are not connected to the second hierarchy node K11, but rather with the second hierarchy node K12 (which represents a "Low priority user").
- The "High priority user" selects one random access sequence from the plurality of available random access sequences depending on the access type and the current channel quality and transmits it to the base station at any arbitrary transmission time instant.
- In the above described embodiment, in total, the random access sequences S23, S24, S25, ..., S31 are available for a "Low priority user" (which is based on the user's subscription with the mobile radio network provider), e.g. a "pre-paid customer", due to the following connections in the hierarchical tree structure 600:
  - The leaf nodes 610, the random access sequences S23, S24, S25, S26 are assigned to, are connected with the first hierarchy node K26 (which represents "Access type=1, Channel quality=Good"), which in turn is connected to the second hierarchy node K12 (which represents a "Low priority user").
  - ...
  - The leaf nodes 610, the random access sequences S29, S30, S31 are assigned to, are connected with the first hierarchy node K29 (which represents "Access type=2, Channel quality=Bad"), which in turn is connected to the second hierarchy node K12 (which represents a "Low priority user").
  - All other leaf nodes, the random access sequences S0, S1, ..., S22 are not assigned to, are not connected to the second hierarchy node K12, but rather with the second hierarchy node K11 (which represents a "High priority user").
- The "Low priority user" selects one random access sequence from the plurality of available random access sequences depending on the access type and the current channel quality and transmits it to the base station at any arbitrary transmission time instant.

In accordance with the embodiment just described, the base station is not able to derive the priority of the random access from the received preamble message that includes the selected random access sequence, i.e. the base station is e.g. not able to determine whether the preamble message is used for an emergency call or for a "normal" random access. Therefore, in this embodiment, there is a risk of a collision of the random access if two users have selected the same random access sequence and have transmitted their respective preamble message at the same time instant, e.g. in the same Access Slot, one user for transmitting an emergency call and the other user e.g. for transmitting a request for a setup of a communication connection.

Thus, in accordance with another embodiment of the invention, it is assumed that a communication system-wide scrambling code is defined in the LTE-UMTS communication system, which is only to be used in the specific case of an emergency call. This means that a first scrambling code SC0 may be associated with the third hierarchy node K0. In the application case, the entire hierarchical tree structure and thus all the associated random access sequences are available for the user, i.e. the user can select randomly any random access sequence from the entire set of random access sequences.

Figure 11:
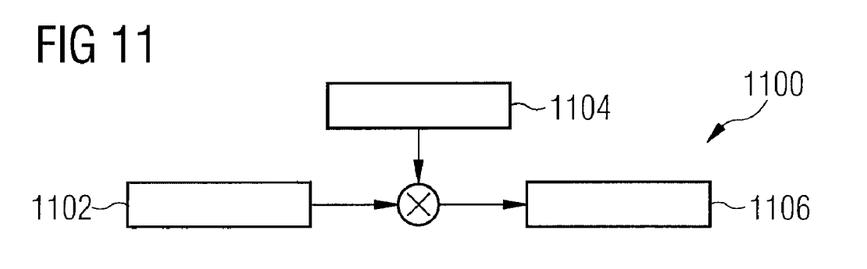
FIG. 11 shows a scrambling diagram in accordance with one embodiment of the invention.

FIG. 11 shows an example of a selected random access sequence 1102 in a scrambling diagram 1100. The selected random access sequence 1102 is scrambled using the first scrambling code SC0 1104 that is associated with the third hierarchy node K0, thereby generating a scrambled random access sequence 1106, which then will be transmitted from the user equipment to the base station in the preamble message, for example.

In one embodiment of the invention, the preamble message for an emergency call is transmitted with an increased initial transmission power in order to additionally increase the detection probability. Based on the detection of the first scrambling code SC0 1104 in the received scrambled random access sequence 1106 in the received preamble message, the receiver in the base station 402 can derive the priority "emergency calls" of the random access that is associated with the first scrambling code SC0 1104. Furthermore, in this embodiment of the invention, there is no risk of a collision with a "normal" random access, even if in both cases the same random access sequence 1102 has been selected, since the scrambled random access sequence 1106 and the "normal" random access sequence 1102 which is not scrambled, do not interfere with each other due to the used first scrambling code SC0 1104.

Independent from the hierarchical tree structure 600 shown in FIG. 6, in accordance with another embodiment of the invention, a defined number of available scrambling codes will be assumed, in the following referred to as SC1, SC2, . . . , SCn. Each scrambling code SC1, SC2, . . . , SCn is assigned with a meaning and the assignment of the scrambling codes SC1, SC2, . . . , SCn with its meanings is communicated to a user equipment by means of the network, e.g. by means of system information, e.g. by means of system information blocks.

Figure 12:
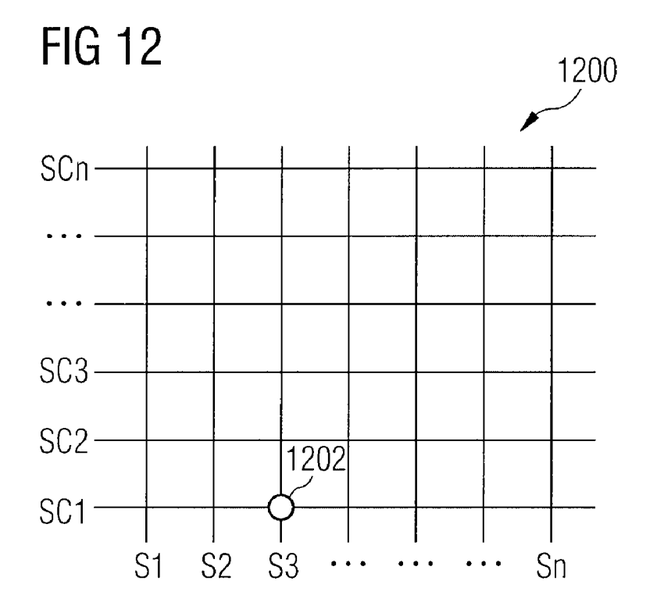
FIG. 12 illustrates an assignment diagram in accordance with one exemplary embodiment of the invention.

FIG. 12 illustrates an assignment diagram 1200 in accordance with one exemplary embodiment of the invention. The assignment diagram 1200 shows the assignment of the scrambling codes SC1, SC2, . . . , SCn to the random access sequences S1, S2, S3, . . . , Sn. The assignment rule is given in a matrix form and it is represented by means of a circle 1202, for example, which scrambling code is assigned to which random access sequence (in FIG. 12, for example, the scrambling code SC1 is assigned to random access sequence S3). Now, it is considered the case in which the meaning "emergency calls" is assigned to the scrambling code SC1. If the user wants to perform a "normal" access and has selected the random access sequence S3 in order to do this, the random access sequence S3 will be transmitted to the base station 402 in a preamble message, for example, without being scrambled. However, in case of an emergency call, the random access sequence S3 will be scrambled using the scrambling code SC1 provided for this and the scrambled random access sequence will be transmitted to the base station 402 in a preamble message, for example.

The foregoing description has been presented for purposes of illustration and description. It is not intended to be exhaustive or to limit the invention to the precise form disclosed, and obviously many modifications and variations are possible in light of the disclosed teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method of generating a preamble message in a communication system, wherein the preamble message is to be transmitted via a communication connection by a user equipment associated with a user, comprising:

the user equipment selecting a hierarchy node out of a plurality of hierarchy nodes, the hierarchy nodes being included in a hierarchical tree structure having at least two hierarchy levels and at least one bottom level, the at least two hierarchy levels including a first hierarchy level and a second hierarchy level, wherein pre-defined random access sequences are grouped in the hierarchical tree structure, the hierarchy nodes being assigned to the at least two hierarchy levels, and each hierarchy node being associated with user information, user equipment information or communication connection information, wherein the user information, the user equipment information or the communication connection information is stored in the user equipment, and the at least one bottom level having a plurality of bottom nodes, each bottom node being associated with at least one random access sequence of a plurality of random access sequences of a defined Physical Random Access Channel and each bottom node being connected according to the tree structure to one node of the second hierarchy level such that to each node of the second hierarchy level, a plurality of bottom nodes are connected;

wherein the user equipment selects the hierarchy node based on a comparison of a characteristic of the user, the user equipment or the communication connection with the stored user information, user equipment information or communication connection information associated with the hierarchy node;

the user equipment selecting at least one random access sequence from a subset of random access sequences of the defined Physical Random Access Channel, the subset including all the random access sequences which are associated with bottom nodes that are included in a partial tree structure having the selected hierarchy node as a partial tree root node; and the user equipment generating the preamble message using the at least one selected random access sequence.

2. The method of claim 1, further comprising:

selecting a scrambling code from a plurality of scrambling codes, the scrambling codes being assigned to the hierarchy nodes of the hierarchical tree structure;

scrambling the selected at least one random access sequence using the selected scrambling code; and generating the preamble message using the scrambled at least one selected random access sequence.

3. The method of claim 1, further comprising:

selecting a scrambling code from a plurality of scrambling codes, the scrambling codes being assigned to the hierarchy levels of the hierarchical tree structure;

scrambling the selected at least one random access sequence using the selected scrambling code; and generating the preamble message using the scrambled at least one selected random access sequence.

4. The method of claim 1, wherein one scrambling code is assigned to each hierarchy level of the plurality of hierarchy levels of the hierarchical tree structure.

5. The method of claim 1, further comprising:

selecting the at least one random access sequence of a physical channel of a defined transport channel/physical channel pair.

6. The method of claim 1, further comprising:

selecting the at least one random access sequence of a defined Physical Random Access Channel/Random Access Channel pair.

7. The method of claim 1, wherein the at least one random access sequence is selected in accordance with a frequency division multiple access procedure.

8. The method of claim 1, wherein the at least one random access sequence is selected in accordance with a single-carrier frequency division multiple access procedure.

9. The method of claim 1, wherein the at least one random access sequence is transmitted in accordance with a Slotted ALOHA access procedure.

10. The method of claim 1, being used in a radio communication system.

11. The method of claim 10, being used in a mobile radio communication system.

12. The method of claim 11, being used in a 3G mobile radio communication system.

13. The method of claim 1, further comprising:

transmitting the preamble message to a communication device.

14. The method of claim 13, wherein the preamble message is transmitted to the communication device via an air interface.

15. The method of claim 13, wherein the communication device is a communication network unit.

16. The method of claim 13, wherein the communication device is a mobile radio base station.

17. The method of generating a preamble message in a communication system according to claim 1, further comprising:

scrambling, by a processor of the user equipment, the selected at least one random access sequence using a scrambling code, wherein the scrambling code for scrambling the random access sequence is selected based on a priority of the random access sequence;

wherein the preamble message is generated using the scrambled at least one random access sequence; and wherein the generated preamble message is transmitted by a transmitter of the user equipment.

18. The method of claim 17, further comprising:

selecting the scrambling code from a plurality of scrambling codes; and generating the preamble message using the scrambled at least one selected random access sequence.

19. The method according to claim 17, further comprising:

receiving the preamble message by a receiver of a communication device;

determining, by a processor of the communication device, a scrambled random access sequence from the received preamble message;

determining, by the processor of the communication device, the scrambling code that has been used for forming the scrambled random access sequence; and determining, by the processor of the communication device, from the determined scrambling code, information about a user the random access sequence is assigned to, or a user equipment the random access sequence is assigned to.

20. The method according to claim 1, further comprising:

receiving the preamble message determining a scrambled random access sequence from the received preamble message;

determining the scrambling code that has been used for forming the scrambled random access sequence; and determining the priority of the random access sequence from the determined scrambling code.

21. The method of claim 20, further comprising:

determining the random access sequence from the scrambled random access sequence.

22. A method of selecting a random access sequence of a plurality of random access sequences of a defined Physical Random Access Channel to be used for transmitting a preamble message via a communication connection by a user equipment associated with a user, comprising:

the user equipment selecting a hierarchy node out of a plurality of hierarchy nodes, the hierarchy nodes being included in a hierarchical tree structure having at least two hierarchy levels and at least one bottom level, the at least two hierarchy levels including a first hierarchy level and a second hierarchy level, wherein pre-defined random access sequences are grouped in the hierarchical tree structure, the hierarchy nodes being assigned to the at least two hierarchy levels, and each hierarchy node being associated with user information, user equipment information or communication connection information, wherein the user information, the user equipment information or the communication connection information is stored in the user equipment, and the at least one bottom level having a plurality of bottom nodes, each bottom node being associated with at least one random access sequence of a plurality of random access sequences of the defined Physical Random Access Channel and each bottom node being connected according to the tree structure to one node of the second hierarchy level such that to each node of the second hierarchy level, a plurality of bottom nodes are connected;

wherein the user equipment selects the hierarchy node based on a comparison of a characteristic of the user, the user equipment or the communication connection with the stored user information, user equipment information or communication connection information associated with the hierarchy node; and the user equipment selecting at least one random access sequence from a subset of random access sequences of the defined Physical Random Access Channel, the subset including all the random access sequences which are associated with bottom nodes that are included in a partial tree structure having the selected hierarchy node as a partial tree root node.

23. An apparatus of a user equipment associated with a user for transmitting data in a communication system via a communication connection, the apparatus comprising:
- a tree structure memory configured to store a hierarchical tree structure, the hierarchical tree structure comprising:
  - at least two hierarchy levels and at least one bottom level, the at least two hierarchy levels including a first hierarchy level and a second hierarchy level, wherein pre-defined random access sequences are grouped in the hierarchical tree structure; and
  - a plurality of hierarchy nodes being assigned to the at least two hierarchy levels, and each hierarchy node being associated with user information, user equipment information or communication connection information, wherein the user information, the user equipment information or the communication connection information is stored in the tree structure memory,
  - wherein the at least one bottom level has a plurality of bottom nodes, each bottom node being associated with at least one random access sequence of a plurality of random access sequences of a defined Physical Random Access Channel and each bottom node being connected according to the tree structure to one node of the second hierarchy level such that to each node of the second hierarchy level, a plurality of bottom nodes are connected;
- a first selector configured to select a hierarchy node out of the plurality of hierarchy nodes wherein the first selector is configured to select the hierarchy node based on a comparison of a characteristic of the user, the user equipment or the communication connection with the stored user information, user equipment information or communication connection information associated with the hierarchy node;
- a second selector configured to select at least one random access sequence from a subset of random access sequences of the defined Physical Random Access Channel, the subset including all the random access sequences which are associated with bottom nodes that are included in a partial tree structure having the selected hierarchy node as a partial tree root node;
- a message generator configured to generate a preamble message using the at least one selected random access sequence; and
- a transmitter configured to transmit the preamble message.

24. A communication device associated with a user, comprising:
- a tree structure memory configured to store a hierarchical tree structure, the hierarchical tree structure comprising:
  - at least two hierarchy levels and at least one bottom level; and
  - a plurality of hierarchy nodes being assigned to the at least two hierarchy levels including a first hierarchy level and a second hierarchy level, wherein pre-defined random access sequences are grouped in the hierarchical tree structure, and each hierarchy node being associated with user information, user equipment information or communication connection information, wherein the user information, the user equipment information or the communication connection information is stored in the tree structure memory wherein the at least one bottom level has a plurality of bottom nodes, each bottom node being associated with at least one random access sequence of a plurality of random access sequences of a defined Physical Random Access Channel and each bottom node being connected according to the tree structure to one node of the second hierarchy level such that to each node of the second hierarchy level, a plurality of bottom nodes are connected;
- a first selector configured to select a hierarchy node out of the plurality of hierarchy nodes wherein the first selector is configured to select the hierarchy node based on a comparison of a characteristic of the user, the user equipment or a communication connection to be used for transmitting a preamble message with the stored user information, user equipment information or communication connection information associated with the hierarchy node;
- a second selector configured to select at least one random access sequence from a subset of random access sequences of the defined Physical Random Access Channel, the subset including all the random access sequences which are associated with bottom nodes that are included in a partial tree structure having the selected hierarchy node as a partial tree root node;
- a message generator configured to generate the preamble message using the at least one selected random access sequence; and
- a transmitter configured to transmit the preamble message.

25. The communication device according to claim 24, further comprising:
- a processor configured to scramble the selected at least one random access sequence using a scrambling code, wherein the scrambling code for scrambling the random access sequence is selected based on a priority of the random access sequence; and
- a processor configured to generate the preamble message using the scrambled at least one selected random access sequence.

26. A communication device for determining information from a preamble message received from the communication device of claim 24, comprising:
- a receiver receiving the preamble message; and
- a processor configured to determine the scrambled random access sequence from the received preamble message, wherein the processor is further configured to determine the scrambling code that has been used for forming the scrambled random access sequence, and
- wherein the processor is further configured to determine, from the determined scrambling code, information about
  - a user the random access sequence is assigned to, or
  - a user equipment the random access sequence is assigned to.

27. An apparatus for determining a priority of a random access sequence that is contained in a preamble message received from the communication device of claim 24, comprising:
- a first determination unit configured to determine the scrambled random access sequence from the received preamble message;
- a scrambling code determination unit configured to determine the scrambling code that has been used for forming the scrambled random access sequence; and
- a priority determination unit configured to determine the priority of the random access sequence from the determined scrambling code.

* * * * *